Patented May 15, 1923.

1,455,630

UNITED STATES PATENT OFFICE.

JOHN ALEXANDER LLOYD, OF COVENTRY, ENGLAND, ASSIGNOR TO COURTAULDS LIMITED, OF LONDON, ENGLAND.

PREPARATION OF STARCH AND SULPHURIC ACID.

No Drawing.   Application filed March 31, 1922. Serial No. 548,529.

*To all whom it may concern:*

Be it known that I, JOHN ALEXANDER LLOYD, a subject of the King of Great Britain, residing at Brookside, Pridmore Road, Coventry, England, have invented new and useful Improvements in the Preparation of Starch and Sulphuric Acid, of which the following is a specification.

This invention consists in an improved preparation of starch and sulphuric acid for use in setting baths employed in the manufacture of threads, filaments, strips, or the like, from viscose as mentioned in the copending application of M. T. Callimachi, Ser. No. 548,477 filed herewith, patented March 27, 1923 under No. 1,449,380.

When starch is mixed with fairly concentrated sulphuric acid, containing say 60 per cent $H_2SO_4$, the starch, when added at the ordinary room temperature, gelatinizes and forms lumps, which cannot, or only with great difficulty can, be mixed with the sulphuric acid, so as to yield a homogeneous mixture suitable for use in the aforesaid setting baths.

According to the present invention, this objection is overcome by employing the sulphuric acid of a concentration of, or about, from 50 to 65 per cent and at a temperature of from about 35° to about 15° centigrade, and adding the starch to such warm, or hot, sulphuric acid. In this way, the starch dissolves in the sulphuric acid and, in a moderately short time, depending to a large extent on the temperature of the sulphuric acid, a solution is obtained suitable for use in setting baths employed in the manufacture of artificial silk threads, filaments, strips, or the like, from viscose. The rate at which the starch can be added to the sulphuric acid varies according to the conditions under which the process is carried out. Thus, for instance, when a temperature of say 40° centigrade is chosen, the starch should be added more slowly than is necessary if a higher temperature, say 70° centigrade, be employed because, in this latter case, the starch dissolves more rapidly. Of course, if too high a temperature, or too concentrated sulphuric acid were used, charring of the starch would be liable to occur, and the temperature and the concentration of the sulphuric acid should be chosen with regard to the product which it is desired to obtain. For instance, if a practically colourless solution be desired, a lower temperature should be employed than is necessary in cases where brown solutions can be produced and employed with impunity.

It was not to be foreseen that such raised temperatures can be employed, without the sulphuric acid charring the starch and giving a worthless product.

This invention is not limited to the employment of any particular kind of starch, but is capable of wide application. For instance, maize starch, potato starch, and even ground rice, can be used. It is also not necessary to employ the starch in a finely divided condition, for instance, starch in the form of tapioca, as it is brought onto the market, can be employed.

The following examples will serve to illustrate how preparations can be prepared in accordance with this invention but the invention is not limited to the precise details of these examples. The parts are by weight.

*Example 1.*

Warm 116 parts of 52 per cent sulphuric acid to 40° centigrade and add thereto, gradually and whilst stirring, 56 parts of maize starch. The addition should extend over a period of about three and a half hours. Continue stirring at the same temperature for another two hours. The product then consists of a light coloured solution of considerable mobility.

*Example 2.*

Heat 116 parts of 52 per cent sulphuric acid to 70° centigrade and add gradually and whilst stirring, 56 parts of maize starch. In this case the addition can be completed in about twenty minutes. Continue stirring for another ten minutes, whereupon a mobile solution is obtained, which is however much darker in colour than is the product of the first example.

*Example 3.*

Heat 112 parts of 50 per cent sulphuric acid to 57° centigrade and add gradually and whilst stirring, 56 parts of potato starch. The time required for the addition in this case may be about thirty minutes. Then continue stirring at the same temperature for about another thirty minutes, whereupon a light brown mobile liquid is obtained.

*Example 4.*

Raise 64 parts of 52 per cent sulphuric acid to about 50° centigrade and then add, gradually and whilst well stirring, 20 parts of ground rice, the time taken during such addition being two and a quarter hours. Then continue stirring at the same temperature for about sixteen hours. A clear brown mobile solution is obtained.

*Example 5.*

Mix 72 parts of 27 per cent sulphuric acid with 168 parts of 77 per cent sulphuric acid, whereupon the temperature of the mixture rises to about 45° centigrade. Then add, in the course of about 30 minutes, while well stirring 100 parts of tapioca. Maintain the temperature at about 45° centigrade. The tapioca gradually dissolves, giving a clear homogeneous solution.

What I claim is:—

The method of obtaining a preparation for use in setting baths for viscose, which comprises the step of dissolving starch in sulphuric acid of substantially from 50 to 65 per cent concentration at a temperature of substantially from 35° C. to 75° C.

In testimony whereof I have signed my name to this specification in the presence of two subscribing witnesses.

JOHN ALEXANDER LLOYD.

Witnesses:
WILLIAM HENRY STOKES,
HORACE JAMES HEGAN.

Certificate of Correction.

It is hereby certified that in Letters Patent No. 1,455,630, granted May 15, 1923, upon the application of John Alexander Lloyd, of Coventry, England, for an improvement in "The Preparation of Starch and Sulphuric Acid," an error appears in the printed specification requiring correction as follows: Page 1, line 30, for "15°" read 75°; and that the said Letters Patent should be read with this correction therein that the same may conform to the record of the case in the Patent Office.

Signed and sealed this 31st day of July, A. D., 1923.

[SEAL.]                                                     KARL FENNING,
*Acting Commissioner of Patents.*